(12) United States Patent
Cai et al.

(10) Patent No.: US 8,406,732 B2
(45) Date of Patent: Mar. 26, 2013

(54) RULE BASED HIERARCHICAL ACCOUNT RESOURCE MANAGEMENT SYSTEM AND METHOD

(75) Inventors: Yigang Cai, Naperville, IL (US); Xiang Yang Li, Beijing (CN)

(73) Assignee: Alcatel Lucent, Paris (FR)

( * ) Notice: Subject to any disclaimer, the term of this patent is extended or adjusted under 35 U.S.C. 154(b) by 250 days.

(21) Appl. No.: 12/734,658

(22) PCT Filed: Nov. 21, 2007

(86) PCT No.: PCT/US2007/024348
§ 371 (c)(1),
(2), (4) Date: May 14, 2010

(87) PCT Pub. No.: WO2009/067101
PCT Pub. Date: May 28, 2009

(65) Prior Publication Data
US 2011/0053555 A1 Mar. 3, 2011

(51) Int. Cl.
*H04M 11/00* (2006.01)
(52) U.S. Cl. .................. 455/406; 455/407; 455/408
(58) Field of Classification Search .............. 455/406, 455/407, 408
See application file for complete search history.

(56) References Cited

U.S. PATENT DOCUMENTS

| | | | |
|---|---|---|---|
| 7,965,997 B2 * | 6/2011 | Sposato et al. | 455/406 |
| 8,042,118 B2 * | 10/2011 | Gilfix et al. | 719/311 |
| 2003/0152039 A1 | 8/2003 | Roberts | |
| 2005/0075957 A1 | 4/2005 | Pincus et al. | |
| 2006/0116105 A1 * | 6/2006 | Frankel et al. | 455/406 |

FOREIGN PATENT DOCUMENTS

| | | |
|---|---|---|
| WO | WO 00/07128 | 2/2000 |
| WO | WO 01/84906 | 11/2001 |
| WO | WO 02/08863 | 1/2002 |
| WO | WO 03/065159 | 8/2003 |
| WO | WO 2007/140007 | 12/2007 |
| WO | WO 2008/000334 | 1/2008 |
| WO | WO 2008/067165 | 6/2008 |

OTHER PUBLICATIONS

Anonymous: Hierarchiacal Accounts Example; JOULE: Distributed Application Foundations, Dec. 20, 1995; XP002498801; Retrieved from Internet Oct. 8, 2008.

* cited by examiner

*Primary Examiner* — Kamran Afshar
*Assistant Examiner* — Sayed T Zewari
(74) *Attorney, Agent, or Firm* — Carmen Patti Law Group, LLC (57) ABSTRACT

A system and method for allocating system resources through a rule based account hierarchy is provided. An Account Manager attempts to apply a system charge to an account. In applying the charge to the account, the Account Manager examines balance selection rules associated with the account. If, after examining the balance selection rules the Account Manager determines that the balance selection rules are satisfied, then the Account Manager attempts to charge the account. If the balance is owned by a parent account, then the charge is routed to that parent account. If the balance is not owned by a parent account, then the balance is charged. If, after examining all the balance selection rules of an account the Account Manager cannot find a balance to charge, then the communication session is disallowed.

20 Claims, 5 Drawing Sheets

RULE BASED HIERARCHICAL ACCOUNT RESOURCE MANAGEMENT SYSTEM AND METHOD

This application claims priority to International Application No. PCT/US2007/024348 filed on Nov. 21, 2007.

TECHNICAL FIELD

This invention is directed to managing network resources and especially to a rule based hierarchical account system and method for managing network resources.

BACKGROUND

In recent years, the popularity of cell phones has led to people using their cell phones for both business and personal use. Because subscribers do not want to have to pay for phone use when it's done for a business purpose, and businesses do not want to have to pay for their employee's personal phone use, many people have two phones and therefore, two accounts: one for personal use, and one for business use. Because the subscriber has two accounts, they receive two bills. A subscriber who has two different cell phone accounts has less incentive to stay with a service provider than a subscriber who has one service provider that provides both business and personal use. In this day when subscribers switch between service providers with great ease and frequency, service providers look for ways to keep subscribers happy so they do not switch.

Another result of the ubiquity of cell phones is the family with multiple cell phones where the parent is paying the wireless bills of one or more children. A parent in this situation may want to receive a single bill for the family's phone use rather than a separate bill for each member of the family. The parent may also want to have the ability to set limits on a child's cell phone use. Similarly, a business may want to have the ability to set limits on an employee's cell phone use.

SUMMARY

The Rule Based Hierarchical Account Resource Management System in one implementation comprises a method with at least one balance selection rule for determining a hierarchical account balance to charge. The method manages system resources based on the results of the application of the balance selection rule to the hierarchical account balance.

The Rule Based Hierarchical Account Resource Management System in another implementation is a system comprising at least one hierarchical account. The system is further comprised of an account manager for managing network usage of a communications session based on applying at least one balance selection rule and selecting a hierarchical account balance to charge based on the application of the at least one balance selection rule.

Additional aspects of the Rule Based Hierarchical Account Resource Management System and method will be apparent to those of ordinary skill in the art in view of the detailed description of various embodiments, which is made with reference to the drawings, a brief description of which is provided below.

DESCRIPTION OF THE DRAWINGS

Features of example implementations of a Rule Based Hierarchical Account Resource Management System will become apparent from the description, the claims, and the accompanying drawings in which:

DETAILED DESCRIPTION

Figure 1:
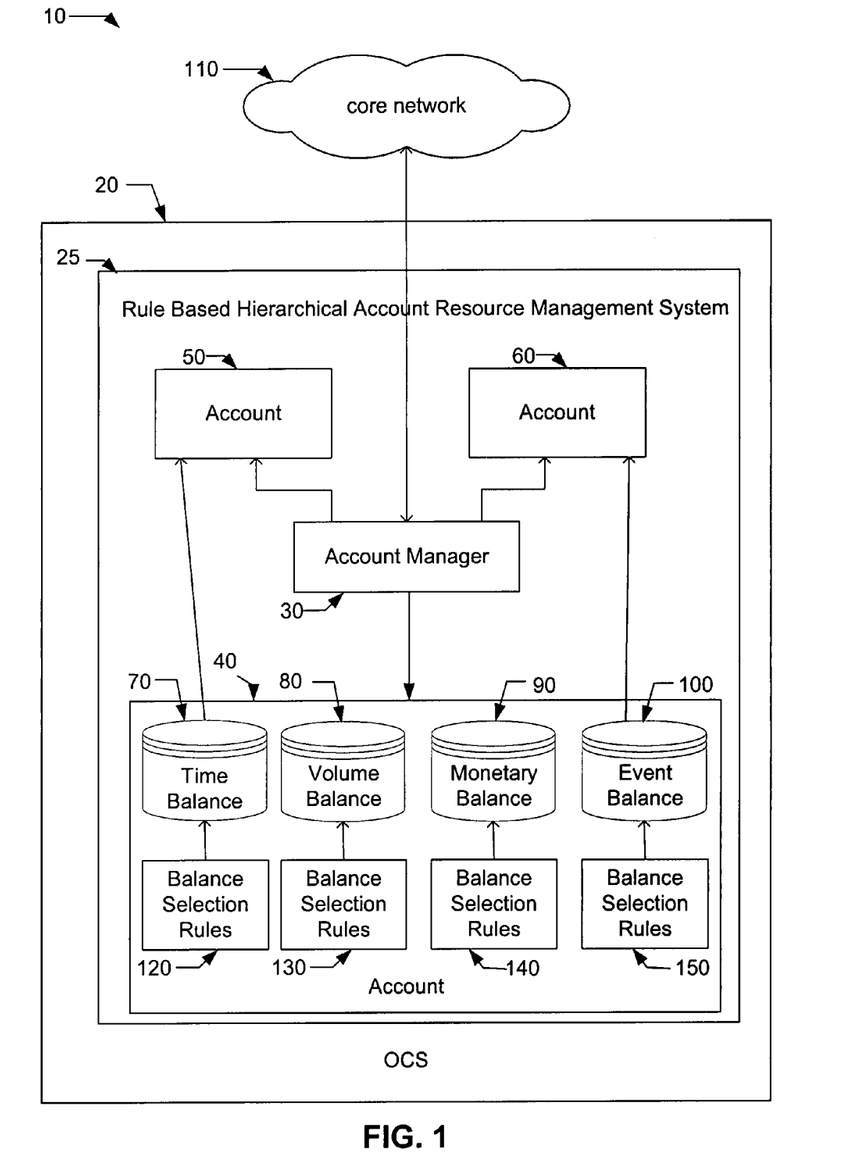
FIG. 1 is a functional block diagram representing a Rule Based Hierarchical Account Resource Management System resident on an Online Charging System (OCS) which is in communication with a core network.

FIG. 1 illustrates a network architecture 10 containing an on-line charging system (OCS) 20, a Rule Based Hierarchical Account Resource Management System 25, an Account Manager 30, and three example hierarchical accounts 40, 50, 60. The hierarchical account 40 is shown comprising a plurality of account balances, including a time balance 70, a volume balance 80, a monetary balance 90, and an event balance 100.

The Rule Based Hierarchical Account Resource Management System 25 may reside on the OCS 20. The OCS 20 provides online charging as requested by the core network 110. Online charging is a process where charging information for resource usage is collected concurrently with that resource usage. Before the resource usage can occur however, the proper authorization for the network resource usage must be obtained.

The core network 110 may be a public switched telephone network (PSTN), Code division multiple access (CDMA) network, Global System for Mobile communications (GSM) network, or any other wireless or terrestrial communications network. If the core network 110 comprises a CDMA network the interface between the core network 110 and the OCS 20 is likely an IS-826 interface. If the core network 110 comprises a PSTN, the interface between the core network 110 and the OCS 20 is likely an Intelligent Network Application Part (INAP) Capability Set 1 (CS1) interface. If the core network 110 comprises a GSM network, the interface between the core network 110 and the OCS 20 is likely a Customized Applications for Mobile network Enhanced Logic (CAMEL) Application Part. If all the accounts of the Rule Based Hierarchical Account Resource Management System 25 are distributed over more than one OCS, the interfaces between the OCSs are likely Diameter Ro interfaces. If the Rule Based Hierarchical Management System 25 resides on the single OCS 20, then an internal interface is used to transfer account information. It will be readily apparent to those of ordinary skill in the art that an internal interface is an interface between two processes or other entities capable of sending and receiving messages where the two processes or entities reside on the same processor. Although various interfaces are described above, those skilled in the art will readily comprehend that a number of other interfaces may also be advantageously employed herein.

A hierarchical account in the Rule Based Hierarchical Account Resource Management System 25 may be, for example, an account affiliated with a cell phone. A subscriber receives periodic bills for system use associated with the hierarchical account. An account balance may record or itemize use of a particular account. For example, an account balance may be stored with an amount of time a subscriber spends using a voice channel. As a further example, there may be an account balance connected with the number of short message service (SMS), or text, messages a subscriber sends. In general, each of the account balances keeps track of activities performed by the cell phone so that, for example, billing of the subscriber may be performed and any limitations, or restrictions, on the permitted usage of the cell phone may be enforced.

A hierarchical account has at least one associated account balance, and each account balance has at least one associated balance selection rule. For example, the account 40 is associated with time balance 70, volume balance 80, monetary balance 90, and event balance 100. As for the association of balances to balance selection rules, time balance 70 is associated with balance selection rules 120, volume balance 80 is associated with balance selection rules 130, monetary balance 90 is associated with balance selection rules 140, and event balance 100 is associated with balance selection rules 150. For purposes of brevity a hierarchical account may be referred to as an account and a hierarchical account balance may be referred to as a balance or an account balance.

An account balance associated with an account may be stored with the account, or the account balance may be stored separately from the account and associated with the account in some manner. For example, an account and its associated account balances could be stored in the same data structure. Alternatively, the account balances and the account could be stored in separate data structures and there could be a mapping between the account and the balances associated with the account. Similarly, a balance selection rule may be stored with a balance, or it may be stored separately from the balance and associated with the balance in some manner. For example, an account balance and its associated balance selection rules may be stored in the same data structure. Alternatively, an account balance and its associated balance selection rules could be stored in separate data structures and there may be a mapping between the account balance and its associated balance selection rules.

Each account balance associated with an account has a balance type. For example, the types of balances associated with the account 40 are a time balance 70, a volume balance 80, a monetary balance 90, and an events balance 100. The balance type determines what information is being monitored concerning the network use of a subscriber. For example, the time balance 70 may contain how much time a subscriber used a voice circuit, the volume balance 80 may contain how much network data a subscriber transferred, the monetary balance 90 may contain how many calls a subscriber has made, and the events balance 100 may contain the number of events a subscriber has executed. An event may be, for example, sending an SMS message. Those of ordinary skill in the art will readily appreciate that a call may be any type of communication session. Thus a voice call, a data call, an SMS message, or any type of communication initiated or received by a communication device is considered a call or communications session. The account balances keep records of network use for a predetermined time period and then are generally reset for the subsequent time period. For example, a subscriber may have a billing plan that permits 100 hours a month of voice communications. Consequently, after a month has ended, the time balance 70 may be reset for the next time period.

A balance selection rule may be defined in terms of a balance rule type. The balance rule types may be a call traffic type, a time period, a day of the week, a roaming status, a location zone, a white list, a black list, a call type, a friend and family designation, a special destination, or a balance threshold.

The call traffic balance selection rule type defines a call traffic type that may be charged to a hierarchical account balance. For example, a call traffic balance selection rule type may permit only voice calls be charged to a particular account balance. The time period defines a time when a balance may be charged or may define a time during which a balance would not accept any charges. For example, a business may want a time period rule to permit balance charging only between the hours of nine to five. The day of the week rule defines days when a balance may or may not be charged.

For example, a business may want a day of the week rule to allow a subscriber to only charge Monday through Friday. The roaming status rule defines if a balance can be charged depending on whether the subscriber is roaming or in a home network. As an example illustration, a business may wish to only have non-roaming calls charged to their account and have roaming calls charged to a personal account of a subscriber. The location zone rule defines if a balance may be charged based on a physical location of a subscriber. In a wireless network, the physical location of a subscriber may be narrowed to a particular location. This narrowing may be done by allowing calls that originate only from a particular wireless base station or only from a particular sector of a wireless base station. For example, a business may only allow calls that originate from a base station close to its office. Call terminations may be similarly restricted by location.

The white list defines telephone numbers that are allowed to charge to a particular balance. If a call origination is made to a number that is not on a white list or the number of a terminating call is not on the white list, the charge corresponding to the call cannot be made to the balance associated with that white list number. One of ordinary skill in the art will readily recognize that a telephone number may be an International Mobile Subscriber Identity (IMSI) associated with a mobile phone, a mobile identification (ID) associated with a mobile phone, a phone number associated with a landline phone or any other method of identifying a device capable of establishing a communication session.

The black list defines telephone numbers barred from charging to a particular account balance. If a call origination is made to a telephone number on a black list or the number of a terminating call is on a black list, then the charge corresponding to the call cannot be made to the balance associated with the black list number. The call type balance selection rule restricts the call type that can charge to a balance. For example, balance selection rules may be set so that international calls may not be charged to a balance.

A friend and family designation, or list, defines calls that are allowed to charge to an account. If the originating or terminating number is not on the friends and family list then the corresponding call charge cannot be made to the balance associated with the friends and family list.

The special designation indicates special numbers that may be charged to a particular account. For example, an account may be set up so that only calls to and from a specific area code may be charged to that account. The Account Manager 30 applies a charge to a balance. The Account Manager 30 may not apply a charge to a balance if the charge exceeds a balance threshold. For example, the balance threshold for a particular balance may be set at ten units. Once the ten unit threshold is reached, the Account Manager 30 may not apply a charge to that balance. The units of the threshold may be measured in a number of ways. The units could be measured in dollar amounts, system time, bytes transferred, calls attempted, calls received, or any other type of units that may be associated with a communication session. As those skilled in the art will readily recognize, any measurable characteristic of a phone or of communications made from or to a phone may be used as a unit.

The Account Manager 30 of the Rule Based Hierarchical Account Management System 25 uses the balance selection rules of an account balance to determine if the Account Manager 30 may charge to the balance associated with the balance selection rules. Upon initiation of a communication session, the core network 110 sends to the OCS 20 a charge request message to requesting that an account be charged for the session. The OCS 20 sends the charge request message to the Account Manager 30. One of ordinary skill in the art will appreciate that any type of charge message could be used in place of the charge request message.

The Account Manager 30 determines an account to charge based on information in the charge request message. For example, the Account Manager 30 may determine that the account 40 should be charged based on a mobile ID contained in the charge request message. In attempting to apply a charge to the account 40, the Account Manager 30 tries to charge in pre-selected sequential order, the time balance 70, the volume balance 80, the monetary balance 90 and the event balance 100. In other words, there is a pre-selected sequential priority to charging balances associated with an account. Assuming, for purposes of illustration, that the Account Manager 30 cannot charge a call to the time balance 70, the account manager 30 tries to charge the volume balance 80. The Account Manager 30 applies the balance selection rules 130 associated with the volume balance 80 to determine if it may apply the charge. The balance selection rules 130 associated with the volume balance 80 may be comprised, for example, of rules limiting the call traffic type, time period, call type, and balance threshold. Balance selection rules 130 are applied in a pre-selected order, that is, there is a priority in applying the rules. Thus, if the balance selection rules 130 are ordered as above, the Account Manager 30 first determines if the account 40 can be charged based on a call traffic type rule. For example, if the call traffic type associated with the volume balance 80 is set for data calls and this is a voice call, the voice call cannot be charged to the volume balance 80. If, on the other hand, this is a data call and the traffic type is set for data calls, then the Account Manager 30 checks the next rule in the balance rules 130 to determine if that rule is satisfied.

In this example case, the Account Manager 30 checks the time period. If the time period does not fall within the time period specified by the balance selection rules 130, the charge is disallowed. This continues until all the balance selection rules 130 associated with the volume balance 80 have been checked by the Account Manager 30. If all the balance selection rules 130 have been satisfied the volume balance 80 is charged. If any of the balance selection rules 130 associated with the volume balance 80 are violated, the Account Manager 30 cannot charge the volume balance 80. If the volume balance 80 cannot be charged, the Account Manager 30 attempts to charge the monetary balance 90 followed by the event balance 100.

If the Account Manager 30 cannot charge an account balance associated with an account, the call is disallowed. Disallowing a call may entail sending a Diameter Ro response message to the core network 110 indicating that the call is disallowed. It will be readily apparent to one of ordinary skill in the art, however, that other types of charging messages may be sent to indicate that a call is disallowed.

In the Rule Based Hierarchical Account Resource Management System 25, an account balance may be associated with a parent (upper-level) hierarchical account. An account balance that is associated with a parent account is referred to as a child of the parent account. For example, the time balance 70 is a child of the account 50. The account 50 is therefore a parent of the time balance 70. A parent account and a child account balance are associated. An association between a child account balance and a parent account may be accomplished by creating a pointer between the two entities, creating a table which contains a list of accounts and associated account balances, creating a table which contains the addresses of associated account balances and accounts, or any other way of identifying an association between a parent account and child account balance. These are just a few example ways of associating an account balance and an account. One of ordinary skill in the art will readily appreciate that there numerous other ways to associate an account balance and an account.

Alternatively, it may also be said that a parent account owns a child account balance. In other words, a parent account owns an account balance that is associated with the parent account. For example, the account 50 is the parent of the time balance 70, thus the account 50 owns the time balance 70. Just as a child account balance is associated with a parent account, an account balance owned by an account is associated with the account. The ways of associating an account balance owned by an account are the same as the ways of associating a child account balance with a parent account.

Based on the application of one or more balance selection rules associated with an account balance, an attempt by the Account Manager 30 to charge the account balance may result in the charge request being routed to another account. The charge may be routed to an account that owns the account balance. Routing a charge request, or message, may entail sending an internal message. Alternatively, routing a charge request may entail the Account Manager 30 attempting to charge the balances associated with a parent account. These are just two examples of how a charge may be routed to an account. Any method that results in a charge being applied to an account that owns an account balance may be an example of routing a message.

FIG. 1. may be used to illustrate how an Account Manager 30 may route a charge request to a responsible account. In FIG. 1 the time balance 70 of the account 40 is owned by, or associated with, the account 50, and the event balance 100 is owned by the account 60. If the Account Manager 30 attempts to charge an account balance, such as the time balance 70, of a first account, such as the account 40, which is owned by a second account, such as the account 50, the charge request is routed to the second account and the balance selection rules of the second account are applied to determine which one of the at least one balance of the second account should be charged. For example, the core network 110 sends a charge request containing a charge for the account 40 to the account manager 30. As per the pre-selected priority of charging account balances, the Account Manager 30 applies the balance selection rules 120 and determines that the time balance 70 of the account 40 should be charged. The Account Manager 30 therefore routes the charge request to the account 50 since the time balance 70 of the account 40 is owned by the account 50. The Account Manager 30 then applies balance selection rules associated with the balances of the account 50 to determine which one of the balances, if any, of the account 50 to charge.

The Rule Based Hierarchical Account Resource Management System or apparatus 25 in one example comprises a plurality of components such as one or more of computer software components. A number of such components can be combined or divided in the apparatus 25. An example component of the apparatus 25 employs and/or comprises a set and/or series of computer instructions written in or implemented with any or a number of programming languages, as will be appreciated by those skilled in the art. The apparatus 25 in one example comprises a vertical orientation, with the description and figures herein illustrating one example orientation of the apparatus 25, for explanatory purposes.

The apparatus 25 in one example employs one or more computer-readable signal-bearing media. The computer-readable signal-bearing media store software, firmware and/or assembly language for performing one or more portions of one or more implementations of the apparatus 25. The computer-readable signal-bearing medium for the apparatus 25 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

Figure 2:
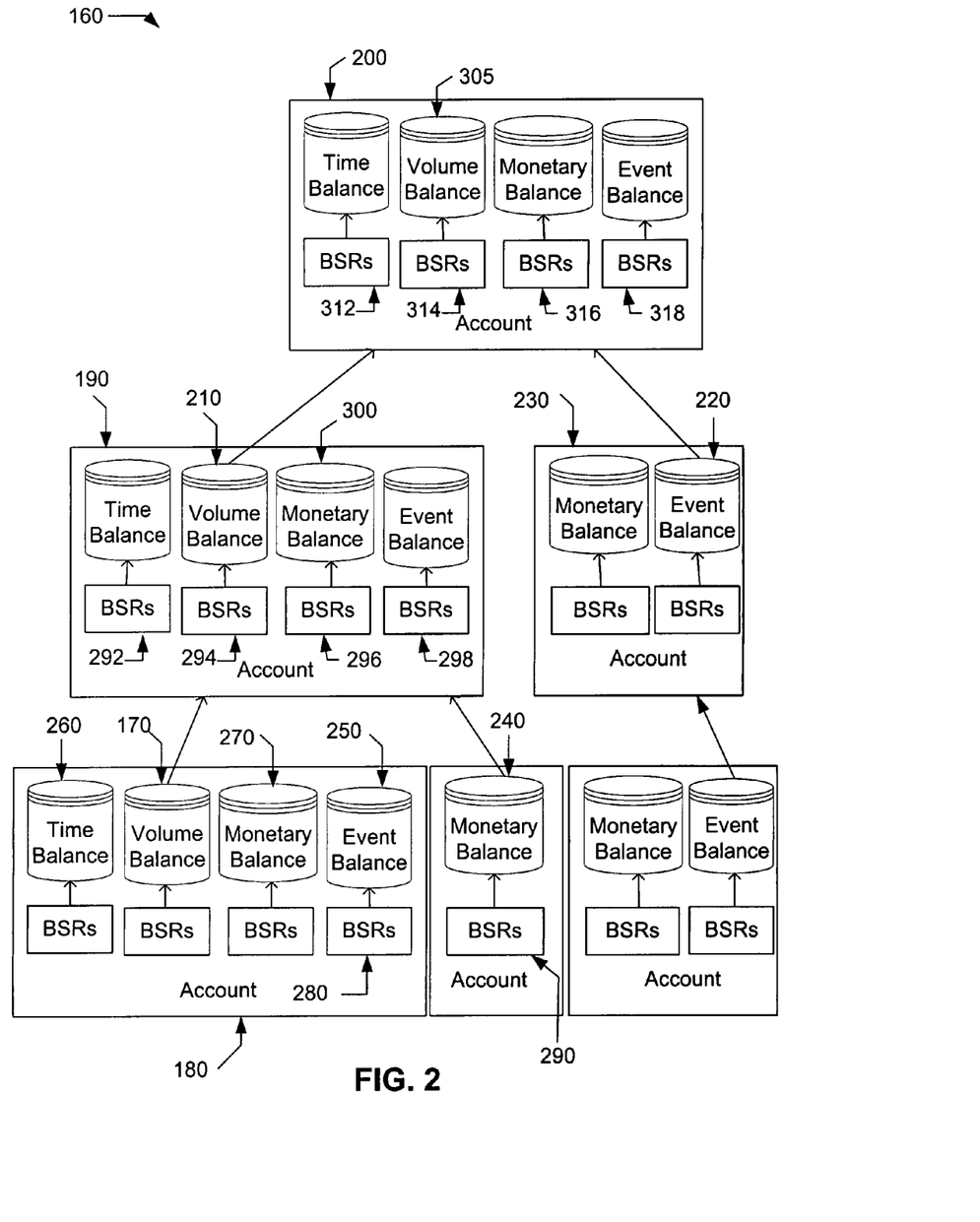
FIG. 2 is an example diagram of an embodiment of a plurality of hierarchical accounts.

Turning to FIG. 2 which is one example of an embodiment of a plurality of hierarchical accounts 160. The plurality of accounts is comprised of parent accounts (upper-level hierarchical accounts) and child accounts (lower-level hierarchical accounts).

As previously discussed, an account balance of a first account may be owned by, or associated with a second account. If the Account Manager 30 attempts to apply a charge to an account balance owned by a parent account, the charge is routed to the parent account. The Account Manager 30 then attempts to apply the charge to an account balance of the parent account. The practical result of routing a charge to a parent account is that a subscriber may pay the charge of another subscriber. For example, an employer may be responsible for paying bills affiliated with a parent account, and an employee may be responsible for paying bills affiliated with a child account. Both accounts may be with the same service provider. A business call by the employee may result in an attempt to charge a balance of the child account. This charge may be routed and applied to the parent account. Therefore, by arranging accounts in a hierarchical manner, that is, in a parent-child manner, a number of account balances may be set up so that one person or entity is billed for the charges of multiple subscribers. In practical terms this may mean that an employer is billed the charges for a number of employees through one parent account. This may alleviate the situation where each employee receives a separate bill for their cell phone use, and each employee is responsible for separating business and personal charges and seeking reimbursement from the employer for the business charges.

As previously discussed an account may have one or more associated account balances, and an account balance may have a parent. For example, as illustrated in FIG. 2, account 180 is associated with volume balance 170 while the volume balance 170 is also a child of account 190. Account 200 is a parent of both volume balance 210 and event balance 220. Account 190 is a parent of volume balance 170 and monetary balance 240, and the account 190 is associated with the volume balance 210, which is a child of the account 200.

FIG. 2 may be also used to illustrate how a hierarchy of accounts may be traversed when the Account Manager 30 attempts to apply a charge. The Account Manager 30 attempts to apply a charge to an account balance based on the balance selection rules associated with the account balance. As a first example, based on the application of one or more balance selection rules the Account Manager 30 may attempt to charge the event balance 250. Before attempting to charge the event balance 250, the Account Manager 30 first tries to apply the charge to time balance 260, volume balance 170, and monetary balance 270. If the Account Manager 30 determines that it cannot apply the charge to any one of the balances 260, 170, 270, the Account Manager 30 tries to apply the charge to the event balance 250. In this case, event balance 250 is not owned by a parent account, thus the Account Manager 30 attempts to apply the charge request to the event balance 250 of the account 180. The Account Manager 30 applies balance selection rules 280 of event balance 250 to determine if the event balance 250 can be charged. If the Account Manager 30 determines that the event balance 250 may not be charged, the call is disallowed.

As a second example, a charge request may result in the Account Manager 30 charging the parent of an account balance. The Account Manager 30 may attempt to charge the monetary balance 240. If balance selection rules 290 are satisfied, then the Account Manager 30 determines that the monetary balance 240 is owned by the account 190. The charge request is routed to the account 190 and the Account Manager 30 applies the balance selection rules 292, 294, 296, 298 of the account 190 to determine which balance of account 190 to charge. After applying the balance selection rules 292, 294, 296, 298 of the account 190, the Account Manager 30 may determine that a monetary balance 300 of the account 190 should be charged, thus the balance 300 is charged and the call allowed. On the other hand, if the Account Manager 30 determines that none of the balances 292, 294, 296, 298 of the account 190 can be charged the call is disallowed.

As a third example, an attempt to charge an account may result in the Account Manager 30 charging the parent of a parent of an account balance. For example, the Account Manager 30 may attempt to charge the volume balance 170. Since volume balance 170 is owned by account 190 the Account Manager 30 applies each of the balance selection rules of account 190. Based on the application of the balance selection rules of account 190, the Account Manager 30 may determine that volume balance 210 should be charged. Because volume balance 210 is owned by account 200, the Account Manager 30 routes the charge to account 200. Based on the application of the balance selection rules 312, 314, 316, 318 of account 200, the Account Manager 30 may determine that volume balance 305 should be charged, the volume balance 305 is charged and the call is allowed. If none of the balances associated with the accounts 180, 190 and 200 can be charged, the call is disallowed.

Figure 3:
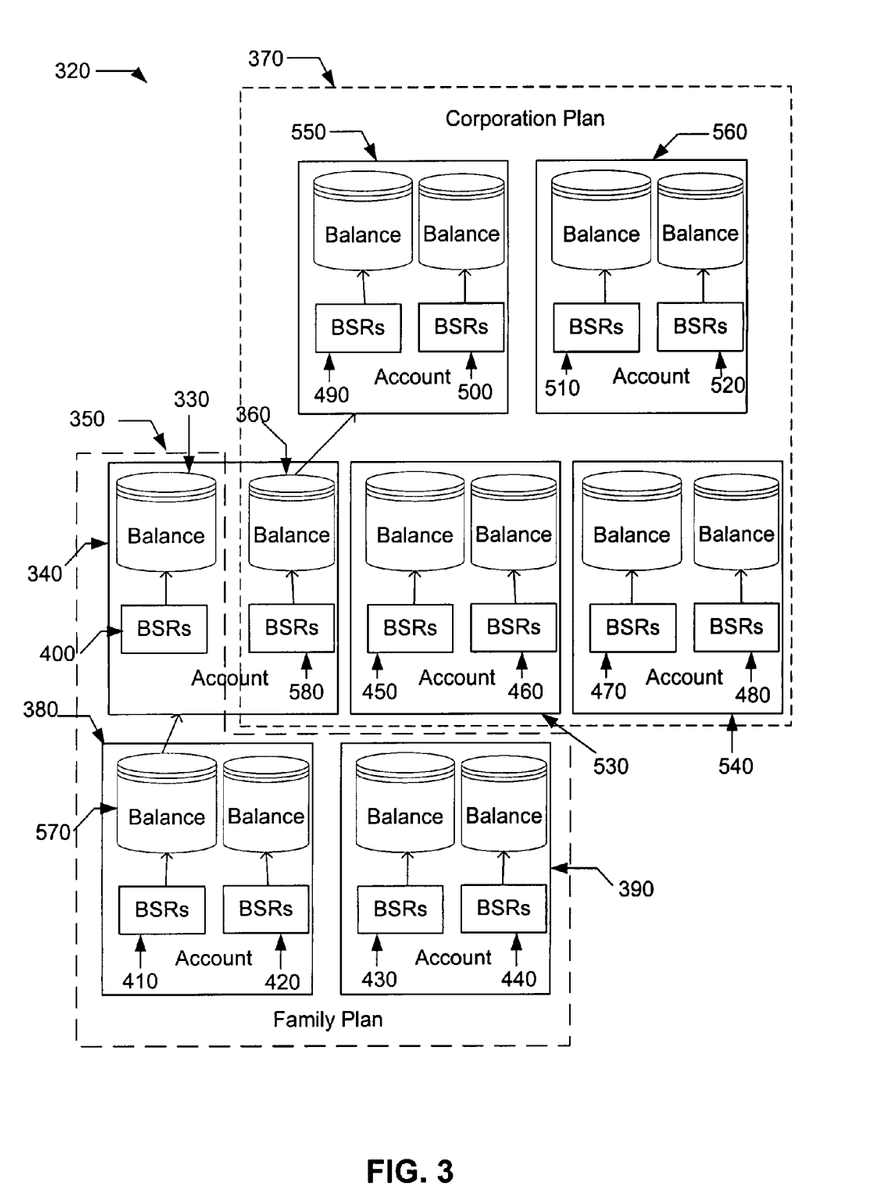
FIG. 3 is an example diagram illustrating a number of hierarchical accounts arranged as a billing plan.

Turning to FIG. 3 which is an example diagram that illustrates a number of rule based hierarchical accounts arranged as a billing plan 320. A billing plan is comprised of at least one account. Each account has an account owner and each billing plan has an owner. Each balance in an account is part of a billing plan, but all the balances of an account do not have to be part of the same billing plan. An account may have some balances that are part of one billing plan and other balances that are part of another billing plan. For example, balance 330 of account 340 is part of Family Plan 350 and balance 360 of account 340 is part of Corporation Plan 370.

For purposes of illustration, a first family member may be the owner of account 380, while a second family member may be the owner of account 390, and a Guardian may be the owner of account 340. Employer may be the owner of Corporation Plan 370 and Guardian the owner of Family Plan 350. Guardian is responsible for paying the balance 330 while employer is responsible for paying the balance 360.

Balance selection rules comprising a billing plan may be updated by the plan owner. An account owner may update balance selection rules if the plan owner permits the update.

These rules may be updated in real-time. Thus, once an account is updated, charges to that account reflect the updated information. As the owner of the Family Plan 350, Guardian can update balance selection rules 400 of balance 330 along with all the balance selection rules 410, 420, 430, and 440 of account 380 and account 390. Subject to Guardian's control, the first and second family members may update the balance selection rules 410, 420, 430, 440 of their respective accounts 380, 390. Similarly, Employer can update all the balance selection rules 450, 460, 470, 480, 490, 500, 510, 520 associated with account 530, account 540, account 550, and account 560. Employer may also update the balance selection rules associated with the balance 360 of account 340. Guardian, who is a member of the Corporation Plan 370 as an employee can update the balance selection rules associated with balance 360 at the discretion of the Corporation Plan owner.

FIG. 3 may also be used to illustrate how a sample balance charge results in a bill for the owner of a billing plan. If the first family member makes a call that results in the core network 110 sending a charge request that the Account Manager 30 routes to account 380, the balance selection rules 410, 420 of account 380 are applied to the charge request which may result in an attempt to charge balance 570. Because balance 570 is owned by account 340, the Account Manager 30 re-routes the charge request to account 340. The balance selection rules 400, 580 of account 340 may result in balance 330 being charged. Ultimately, Guardian is responsible for any charges associated with balance 330. On the other hand, if Guardian makes a call that results in an attempt to charge balance 360, the charge request is routed to account 550. The owner of Corporation Plan 370 is responsible for charges to account 550 and must pay any bills associated with charges to the balances of the account 550.

Figure 4:
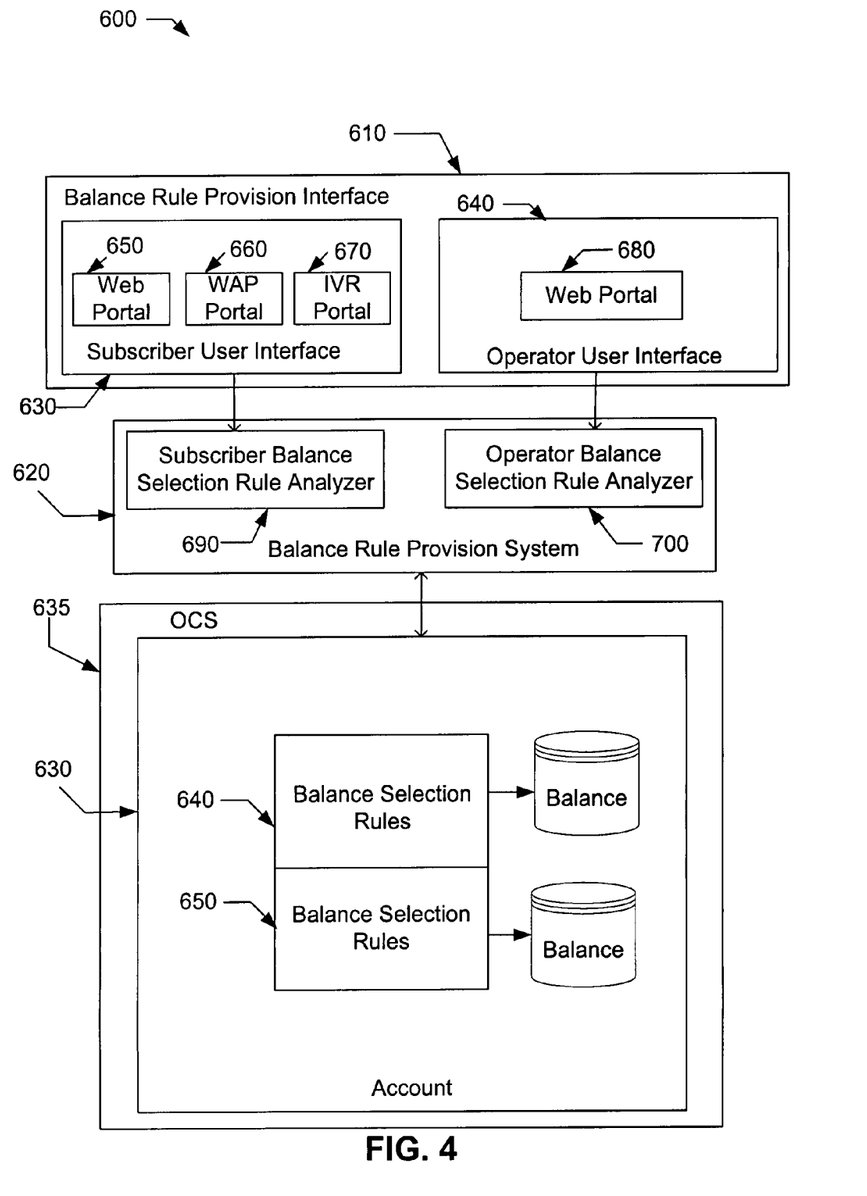
FIG. 4 is a functional block diagram of an embodiment of a balance rule provisioning channel, a rule provisioning system, and a sample account.

Turning to FIG. 4 which is a functional block diagram 600 illustrating a balance rule provisioning channel 610, a balance rule provisioning system 620, and an account 630 which resides on an OCS 635. An operator or subscriber may use the balance rule provision channel 610 to update balance selection rules associated with their accounts in real-time. An operator or subscriber may also use the rule balance rule provision interface 610 for sending hierarchical account related messages. The account related messages may be related to the adding, deleting and arranging of balance selection rules. The messages may also be related to reordering the priority of the balances associated with an account.

A subscriber and an operator may use different user interfaces. The subscriber may use a subscriber user interface 630 and the operator may use an operator user interface 640. The subscriber user interface 630 contains a web portal 650, a Wireless Access Protocol (WAP) portal 660, or an Interactive Voice Response (IVR) portal 670. The user interface 630 is comprised of one or more of these portals. The operator user interface 640 may have a web portal 680.

Balance selection rules input through the subscriber user interface 630 and operator user interface 640 are sent to the balance rule provisioning system 620. The balance rule provisioning system 620 contains a subscriber balance selection rule analyzer 690 and an operator balance selection rule analyzer 700. If a subscriber attempts to modify a set of balance selection rules, the balance rule provisioning system 620 forwards these modifications to the subscriber balance selection rule analyzer 690. Similarly, when an operator attempts to modify balance selection rules, the balance rule provisioning system 620 forwards these modifications to the operator balance selection rule analyzer 700.

If a subscriber attempts to modify balance selection rules, the subscriber balance selection rule analyzer 690 verifies that the modifications are allowable. For example, if a subscriber tries to modify a set of balance selection rules and is not the billing plan owner, then the subscriber may be allowed to make some updates but not others. For example, the billing plan owner may allow the subscriber to update the white list, but not the traffic type or time period. If the subscriber tries to update the white list, the subscriber balance selection rule analyzer 690 allows the change. If, on the other hand, the subscriber tries to update the traffic type or time period, then the subscriber balance selection rule analyzer 690 disallows the update.

The operator balance selection rule analyzer 700 verifies that balance selection rules entered by an operator are allowable. This may entail ensuring that the balance selection rules are syntactically correct, that the rules the operator attempts to modify are rules being used by a particular account, and any other checks to make sure that the operator correctly entered the balance selection rules.

The functional block diagram 600 in one example comprises a plurality of components such as one or more of computer software components. A number of such components can be combined or divided in the functional block diagram 600. An example component of the functional block diagram 600 employs and/or comprises a set and/or series of computer instructions written in or implemented with any or a number of programming languages, as will be appreciated by those skilled in the art. The functional block diagram 600 in one example comprises a vertical orientation, with the description and figures herein illustrating one example orientation of the functional block diagram 600, for explanatory purposes.

The functional block diagram 600 in one example employs one or more computer-readable signal-bearing media. The computer-readable signal-bearing media store software, firmware and/or assembly language for performing one or more portions of one or more implementations of the apparatus. The computer-readable signal-bearing medium for the functional block diagram 600 in one example comprise one or more of a magnetic, electrical, optical, biological, and atomic data storage medium. For example, the computer-readable signal-bearing medium comprises floppy disks, magnetic tapes, CD-ROMs, DVD-ROMs, hard disk drives, and electronic memory.

Figure 5:
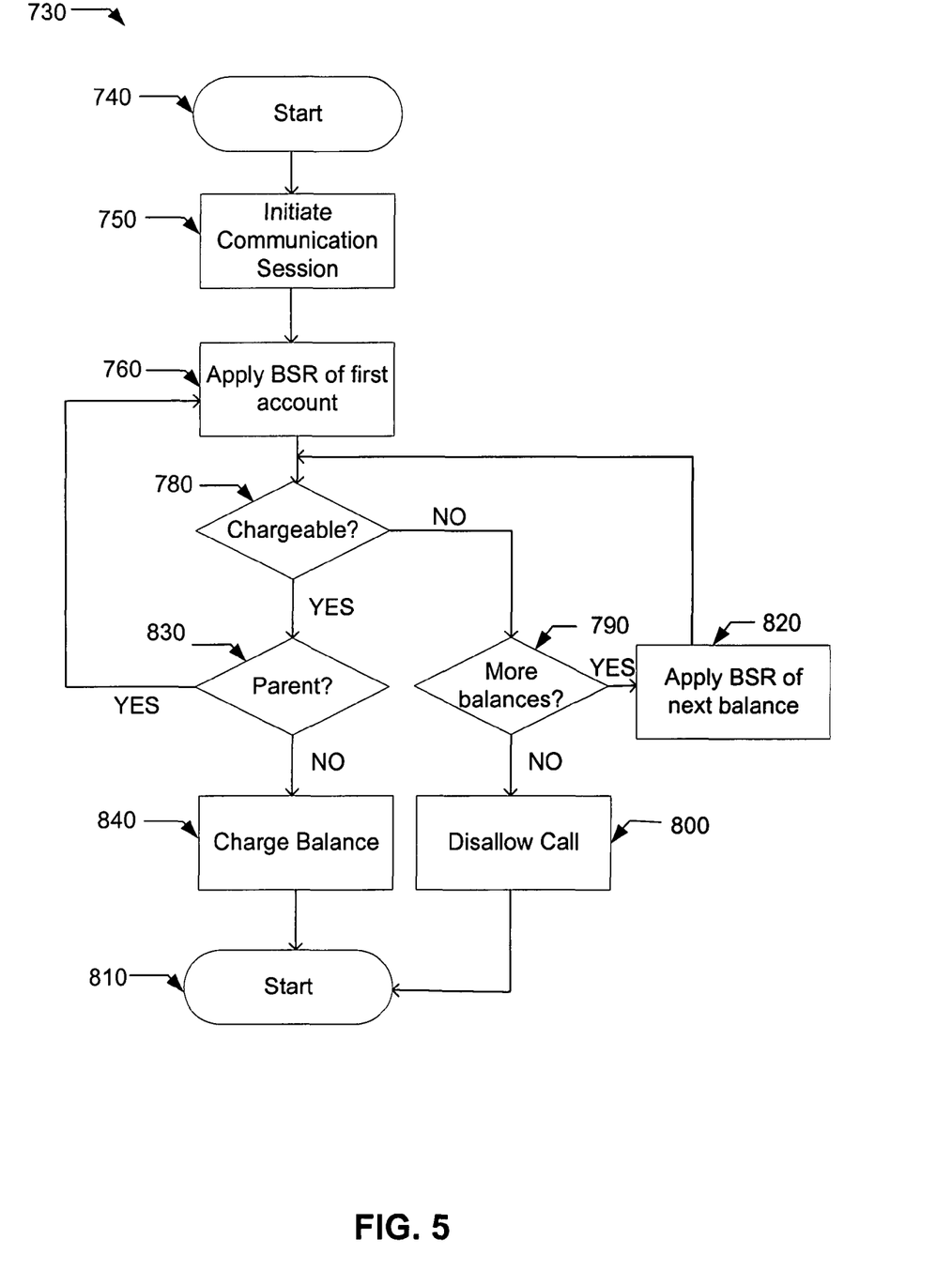
FIG. 5 is a representation of one implementation of a rule based hierarchical balance selection method that comprises determining whether a hierarchical account balance should be charged.

Turning to FIG. 5, one example of a rule based hierarchical balance selection method 730 for charging an account balance and for managing network usage is shown. The method 730 begins in an idle state 740. A subscriber initiates a communications session 750. The communications session results in an attempt to charge a hierarchical account. The Account Manager 30 attempts to charge an account by applying a set of balance selection rules of a first balance associated with the account 760. If the Account Manager 30 cannot charge the account 780 the method determines if there are more balances in the account 790. If there are no more balances in the account 790, the call is disallowed 800 and the method ends 810. If there are more balances in the account 790, the balance selection rules associated with the next balance are applied 820 and the method 730 repeats the process of determining if the balance is chargeable 780.

If the balance is chargeable 780 the method 730 determines if the balance has a parent account 830. If the balance has a parent account, then the method 730 applies the balance selections rules of the first balance associated with the parent account 760. If there is no parent associate with the balance 830, the balance is charged 840 and the method 730 ends 810.

The steps or operations described herein are just for example. There may be many variations to these steps or operations without departing from the spirit of the Rule Based Hierarchical Account Resource Management System. For instance, the steps may be performed in a differing order, or steps may be added, deleted, or modified.

Although example implementations of the Rule Based Hierarchical Account Resource Management System have been depicted and described in detail herein, it will be apparent to those skilled in the relevant art that various modifications, additions, substitutions, and the like can be made without departing from the spirit of the Rule Based Hierarchical Account Resource Management System and these are therefore considered to be within the scope of the Rule Based Hierarchical Account Resource Management System as defined in the following claims.

What is claimed is:

1. A method for applying charges for wireless network system usage to hierarchical accounts comprising the steps of:
   receiving notification of the initiation of a communication session;
   applying at least one balance selection rule to select a responsible hierarchical account balance to charge;
   determining whether or not the selected hierarchical account balance has a parent account; and
      if the selected hierarchical account balance has a parent account, returning to the step of applying at least one balance selection rule to select a different responsible hierarchical account balance;
      if it does not, charging the selected hierarchical account balance.

2. The method of claim 1 wherein the step of applying at least one balance selection rule further comprises the step of determining a type of the balance selection rule.

3. The method of claim 1 wherein the step of applying at least one balance selection rule further comprises the step of applying the at least one balance selection rule based on a priority.

4. The method of claim 1 further comprising the step of disallowing a communication session, if there are no hierarchical account balances responsible for the charge request.

5. A system comprising:
   at least one hierarchical account; and
   an account manager for applying charges for wireless network system usage to hierarchical accounts by:
   receiving notification of the initiation of a communication session;
   applying at least one balance selection rule and selecting a responsible hierarchical account balance from the at least one hierarchical account;
   determining whether or not the selected hierarchical account balance has a parent account; and
      if the selected hierarchical account balance has a parent account, returning to the step of applying at least one balance selection rule to select a different responsible hierarchical account balance;
      if not, charging the selected hierarchical account balance.

6. The system of claim 5 wherein the at least one hierarchical account comprises a parent hierarchical account and a child hierarchical account.

7. The system of claim 5 wherein the at least one hierarchical account further comprises:
   at least one hierarchical account balance associated with the at least one hierarchical account where the at least one hierarchical account balance is used to store network usage balances; and
   at least one balance selection rule associated with the at least one hierarchical account balance used to determine network usage.

8. The system of claim 5 further comprising:
   a balance rule provision interface for providing balance selection rules;
   a balance rule provisioning system for provisioning and verifying balance selection rules in real-time; and
   a message protocol interface for receiving and sending hierarchical account-related messages.

9. The system of claim 8 wherein the balance rule provision interface further comprises:
   a subscriber user input for inputting subscriber balance selection rules in real-time and providing the subscriber balance selection rules to the balance rule provisioning system; and
   an operator user input for inputting operator balance selection rules in real-time and providing the operator balance selection rules to the balance rule provisioning system.

10. The system of claim 9 wherein the subscriber user input comprises at least one of:
   a web portal input for inputting the subscriber balance selection rules;
   a wireless access protocol input for inputting the subscriber balance selection rules; and
   an interactive voice recognition input for inputting the subscriber balance selection rules.

11. The system of claim 9 wherein the operator user input comprises a web portal for inputting operator balance selection rules.

12. The system of claim 8 wherein the message protocol interface further comprises a Diameter Ro protocol interface for sending and receiving Diameter Ro protocol messages if the system resides on a plurality of online charging systems.

13. The system of claim 8 wherein the message protocol interface further comprises a user defined protocol interface for sending and receiving messages if the system resides on an online charging system.

14. The system of claim 5 wherein the account manager selects at least one a hierarchical account balance to charge and disallows a communication session if there are no hierarchical accounts to route a charge to and there are no hierarchical account balances to charge.

15. The system of claim 5 wherein the at least one hierarchical account is arranged as at least one billing plan.

16. The system of claim 15 wherein the at least one billing plan comprises at least one subscriber and at least one hierarchical account balance.

17. The system of claim 15 wherein the at least one hierarchical account comprises a plurality of associated hierarchical account balances where each of the associated hierarchical account balances belongs to a different billing plan.

18. The system of claim 5 wherein each hierarchical account is associated with at least one billing plan.

19. A method for applying charges for wireless network system usage to hierarchical accounts comprising the steps of:
   receiving notification of the initiation of a communication session;
   applying at least one balance selection rule to select a responsible hierarchical account balance to charge;

determining whether or not the selected account is chargeable;
if the selected account is chargeable, performing the following steps:
   determining whether or not the selected hierarchical account has a parent account;
      if so, applying at least one balance selection rule of the parent account, selecting a responsible hierarchical account balance to charge;
      if not, charging the balance of the selected hierarchical account,
if the selected account is not chargable, performing the following steps:
   determining if more accounts are available, applying at least one balance selection
   rule to select a responsible hierarchical account balance to charge and returning to the step of determining whether of not the selected account is chargeable;
      if so, applying at least one balance selection rule:
      if not, disallowing the communication session.

20. The method of claim 19 further comprising the steps of:
inputting subscriber balance selection rules in real-time and providing the subscriber balance selection rules to the balance rule provisioning system using a subscriber user input;
inputting operator balance selection rules in real-time and providing the operator balance selection rules to the balance rule provisioning system using an operator user input;
provisioning and verifying the balance selection rules in real-time using a balance rule provision interface; and
sending hierarchical account-related messages using a message protocol interface for receiving.

* * * * *